United States Patent
Matulik et al.

(10) Patent No.: US 10,620,881 B2
(45) Date of Patent: Apr. 14, 2020

(54) ACCESS TO DRAM THROUGH A REUSE OF PINS

(71) Applicant: Microchip Technology Incorporated, Chandler, AZ (US)

(72) Inventors: Eric Matulik, Meyreuil (FR); Patrick Filippi, Seillons-Source-d'argens (FR); Marc Maunier, Marseilles (FR)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 88 days.

(21) Appl. No.: 15/959,764

(22) Filed: Apr. 23, 2018

(65) Prior Publication Data
US 2019/0324686 A1    Oct. 24, 2019

(51) Int. Cl.
*G06F 3/06* (2006.01)
*G06F 12/06* (2006.01)

(52) U.S. Cl.
CPC .......... *G06F 3/0659* (2013.01); *G06F 3/0604* (2013.01); *G06F 3/0673* (2013.01); *G06F 12/06* (2013.01); *G06F 2212/1041* (2013.01)

(58) Field of Classification Search
None
See application file for complete search history.

(56) References Cited

U.S. PATENT DOCUMENTS

| | | | | |
|---|---|---|---|---|
| 6,598,148 | B1* | 7/2003 | Moore | G06F 7/5272 |
| | | | | 711/E12.02 |
| 6,859,399 | B1 | 2/2005 | Azimi et al. | 365/189.03 |
| 2010/0325333 | A1 | 12/2010 | Kimelman et al. | 710/306 |
| 2013/0111122 | A1* | 5/2013 | Song | G06F 13/1647 |
| | | | | 711/105 |

FOREIGN PATENT DOCUMENTS

EP    2500827 A2    9/2012    ............ G06F 13/16

OTHER PUBLICATIONS

International Search Report and Written Opinion, Application No. PCT/US2019/028450, 11 pages, dated Jul. 12, 2019.

* cited by examiner

*Primary Examiner* — Denise Tran
(74) *Attorney, Agent, or Firm* — Slayden Grubert Beard PLLC (57) ABSTRACT

An apparatus includes an interface for dynamic random access memory (DRAM); and an integrated circuit. The integrated circuit includes a memory pinout configured to connect to the memory and control logic. The control logic is configured multiplex address information, command information, and data to be written to or read from the DRAM memory on a subset of pins of the memory pinout to the DRAM memory. The control logic is further configured to route other signals on other pins of the memory pinout to the DRAM in parallel with the multiplexed address information, command information, and data information.

18 Claims, 8 Drawing Sheets

SDR-SDRAM 16 Mbits :
512K x 16 x 2 BANKS

| SDRAM PINS | |
|---|---|
| PIN NAME | PIN DESCRIPTION |
| A0-A10 (11 PINS) | ROW ADDRESS INPUT — 444 |
| BA (1 PIN) | BANK SELECT ADDRESS — 442 |
| A0-A7 | COLUMN ADDRESS INPUT — 444 |
| DQ0-DQ15 (16 PINS) | DATA I/O — 440 |
| CLK (1 PIN) | SYSTEM CLOCK INPUT — 458 |
| CKE (1 PIN) | CLOCK ENABLE — 454 |
| DQM0-DQM1 (2 PINS) | MASK — 460 |
| #RAS (1 PIN) | ROW ADDRESS STROBE COMMAND — 452 |
| #CAS (1 PIN) | COLUMN ADDRESS STROBE COMMAND — 450 |
| #CS (1 PIN) | CHIP SELECT — 456 |
| #WE (1 PIN) | WRITE ENABLE — 448 |

MCU/MPU PINS

| | 432 | | | | | | | | | | | | | | | 434 | 436 | 438 |
|---|---|---|---|---|---|---|---|---|---|---|---|---|---|---|---|---|---|---|
| MODE 1 | DQ0 | DQ1 | DQ2 | DQ3 | DQ4 | DQ5 | DQ6 | DQ7 | DQ8 | DQ9 | DQ10 | DQ11 | DQ12 | DQ13 | DQ14 | DQ15 | DQM0 | DQM1 | #CS | CKE | CLK |
| MODE 2 | A0 | A1 | A3 | A4 | A4 | A5 | A6 | A7 | A8 | A9 | A10 | BA | --- | #WE | #CAS | #RAS | | | | | |
| PIN | 0 | 1 | 2 | 3 | 4 | 5 | 6 | 7 | 8 | 9 | 10 | 11 | 12 | 13 | 14 | 15 | 16 | 17 | 18 | 19 | 20 |

SDR-SDRAM 256
MBITS : 4 MEG x
16 x 4 BANKS

| SDRAM PINS | |
|---|---|
| PIN NAME | PIN DESCRIPTION |
| A0-A12 (13 PINS) | ROW ADDRESS INPUT — 844 |
| BA0-BA1 (2 PINS) | BANK SELECT ADDRESS — 842 |
| A0-A8 | COLUMN ADDRESS INPUT — 844 |
| DQ0-DQ15 (16 PINS) | DATA I/O — 840 |
| CLK (1 PIN) | SYSTEM CLOCK INPUT — 858 |
| CKE (1 PIN) | CLOCK ENABLE — 854 |
| DQM0-DQM1 (2 PINS) | MASK — 860 |
| #RAS (1 PIN) | ROW ADDRESS STROBE COMMAND — 852 |
| #CAS (1 PIN) | COLUMN ADDRESS STROBE COMMAND — 850 |
| #CS (1 PIN) | CHIP SELECT — 856 |
| #WE (1 PIN) | WRITE ENABLE — 858 |

FIG. 9

ACCESS TO DRAM THROUGH A REUSE OF PINS

FIELD OF THE INVENTION

The present disclosure relates to the use of memory such as dynamic random-access-memory (DRAM) and, more particularly, to using DRAM by limiting input and output (I/O or IO) or using DRAM in a serial manner through reuse of pins.

BACKGROUND

DRAM is often used instead of static RAM for large main memories of electronic devices such as computers, servers, smartphones, or game consoles. DRAM uses a variety of packaging formats, depending upon the maker and the particular model. For example, DRAM may be implemented in dual in-line packages (DIP), single in-line pin packages (SIPP), single in-line memory modules (SIMM), dual in-line memory modules (DIMM), Rambus in-line memory modules (RIMM), and small outline DIMM (SO-DIMM). DRAM may be produced as an integrated circuit (IC) package. The DRAM IC may include an IC bonded and mounted into plastic packages with metal pins for connection to control signals and buses. The DRAM package may be implemented as plug-in modules for easier handling. DRAM may include synchronous DRAM (SDRAM). SDRAM may include single data rate SDRAM (SDR-SDRAM), double data rate SDRAM (DDR-SDRAM), low power DDR-SDRAM (LPDDR-SDRAM), low power SDR-SDRAM (LPSDR-SDRAM), or any other suitable implementation.

SUMMARY

Embodiments of the present disclosure include an apparatus. The apparatus includes an interface to DRAM memory and an integrated circuit. The integrated circuit may include a memory pinout configured to connect to the DRAM memory and control logic. The control logic may be configured to multiplex address information, command information, and data to be written to or read from the DRAM memory on a subset of pins of the memory pinout to the DRAM memory. The control logic may be further configured to route other signals on other pins of the memory pinout to the DRAM memory in parallel with the multiplexed address information, command information, and data information.

In combination with any of the above embodiments, the command information may be configured to cause the DRAM memory to ignore input pins of the DRAM memory configured to receive data to be written to the DRAM memory.

In combination with any of the above embodiments, the command information may be configured to cause the DRAM memory to, in first cycle, load initial address information. In combination with any of the above embodiments, the command information may be configured to cause the DRAM memory to, in a second cycle subsequent to the first cycle, use implicit address information derived from the initial address information, and to write or read data using pins that held the initial address information in the first cycle.

In combination with any of the above embodiments, the initial address information may be provided at a location before a desired address location for the write of data.

In combination with any of the above embodiments, the control logic may be configured to multiplex address information, command information and data to be written to or read from the DRAM memory by sending command and address information in a first memory cycle to the DRAM memory on a set of pins, and sending or receiving data to be written to or read from the DRAM memory in a second memory cycle on the set of pins.

In combination with any of the above embodiments, the control logic is configured to multiplex address information, command information and data to be written to or read from the DRAM memory by sending command and address information in a first memory cycle to the DRAM memory. In combination with any of the above embodiments, the command information configures the DRAM memory to ignore input data pins in the first memory cycle.

In combination with any of the above embodiments, the control logic may be configured to multiplex address information, command information and data to be written to or read from the DRAM memory by, in first memory cycle, routing command information and address information from a same set of pins on the integrated circuit as data to be written to or read from the DRAM memory. In combination with any of the above embodiments, the command information configures the DRAM memory to ignore input data received at the DRAM memory from the set of pins on the integrated circuit.

In combination with any of the above embodiments, the control logic may be configured to multiplex address information, command information and data to be written to or read from the DRAM memory by routing command information and address information from a same set of pins on the integrated circuit as data to be written to or read from the DRAM memory. In combination with any of the above embodiments, a data pin on the DRAM memory and a command pin on the DRAM memory are connected to a same given pin on the integrated circuit, the given pin a member of the set of pins.

In combination with any of the above embodiments, the command information to be multiplexed with the data to be written to or read from the DRAM memory may include one or more of a column address strobe command, a row address strobe command, and a write enable command.

In combination with any of the above embodiments, the control logic may be configured to multiplex address information, command information and data to be written to or read from the DRAM memory by using a data mask to instruct the DRAM memory to ignore present values on data input pins of the DRAM memory, setting reading or writing of data to continuous burst mode, and setting an address to a location previous to an intended write location or an intended read location.

Embodiments of the present disclosure include computers, controllers, memory controllers, microcontrollers, processors, mobile devices, and electronic devices including a DRAM and any of the apparatus embodiments above.

Embodiments of the present disclosure include methods performed by any of the embodiments above of computers, controllers, memory controllers, microcontrollers, processors, mobile devices, and electronic devices.

DETAILED DESCRIPTION

Figure 1:
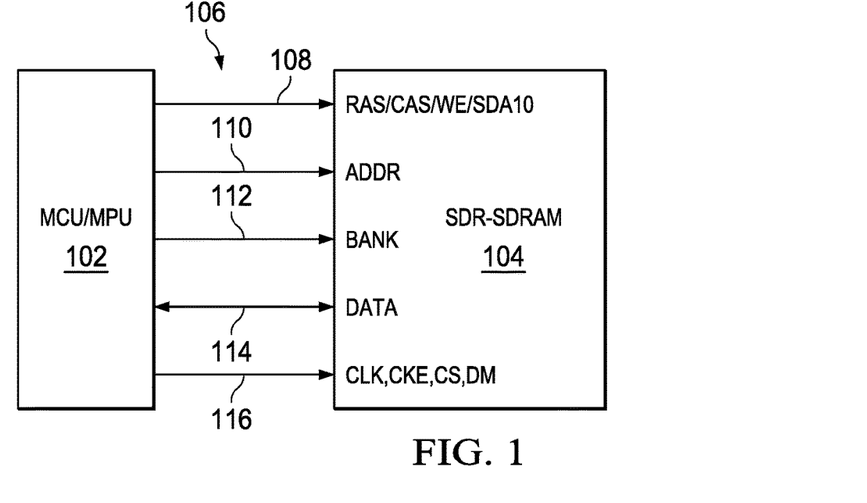
FIG. 1 illustrates an example logical interface between a processor and SDRAM, according to embodiments of the present disclosure.

FIG. 1 illustrates an example logical interface 106 between a processing unit and a memory, according to embodiments of the present disclosure. The processing unit may include a processor, microprocessor (MPU), microcontroller (MCU), a memory management controller, Field Programmable Gate Array (FPGA), Application Specific Integrated Circuit (ASIC), integrated circuit, chip, or other suitable electronic device. The processing unit may be referred to as MCU 102, though MCU 102 may be implemented in any suitable manner. The memory may include any suitable memory, such as a DRAM, SDRAM, SDR-SDRAM, DDR-SDRAM, low power DDR-SDRAM, low power SDR-SDRAM, or any other suitable implementation. The memory may be referred to as SDRAM 104.

Interface 106 between MCU 102 and SDRAM 104 may include a mapping of data pins on MCU 102 to pins on SDRAM 104. The pins may include ports, physical pins, busses, or other sources of information. The information may enable writing to and reading from SDRAM 104. Interface 106 may include any suitable information for writing to and reading from memory. The information may include data to be written to or read from SDRAM 104. The information may include commands to facilitate or configure the transfer of data, wherein the data is to be written to or read from SDRAM 104. The information may include clocking or other synchronization for reading from or writing to data from SDRAM 104.

Interface 106 may include an exchange of address information. Address information may be expressed as, for example, A # or ADDR #. Address information may be sent from MCU 102 to SDRAM 104 over a logical interface or path 110. Address information may be used to select rows and addresses of locations in SDRAM 104 to which data is to be written. Any suitable number of bits may be used on SDRAM 104 to designate or receive address information. The number of bits used may depend upon the size of SDRAM 104. For example, eleven or thirteen bits may be used.

Interface 106 may include an exchange of bank information. Bank information may designate which physical bank of memory locations is to be used for access. Bank information may be expressed as, for example, BA, BANK, BA #, or BANK #. Bank information may be sent over a logical path 112 from MCU 102 to SDRAM 104. Any suitable number of bits may be used on SDRAM 104 to designate or receive bank information. The number of bits used may depend upon the size of SDRAM 104. For example, one or two bits may be used.

Interface 106 may include an exchange of data information to be written to or read from SDRAM 104. Data information may be expressed as, for example, DATA, DQ #, or D #. Data to be written to or read from SDRAM 104 may be sent between MCU 102 and SDRAM 104 over a logical interface or path 114. Any suitable number of bits may be used on SDRAM 104 to represent data inputs and outputs for data to be written to or read from SDRAM 104. The number of bits used may depend upon the size of SDRAM 104. For example, sixteen bits may be used.

Interface 106 may include an exchange of other commands or information.

Clock information or a clock signal may be sent from MCU 102 to SDRAM 104. This signal may be sent on, for example, logical path 116. A clock signal may synchronize operations of MCU 102 and SDRAM 104. A clock signal may be expressed as, for example, CLK or CLOCK. Any suitable number of bits may be used on SDRAM 104 to designate or receive the clock signal. For example, one pin may be used.

A clock enable signal may be sent from MCU 102 to SDRAM 104. This signal may be sent on, for example, logical path 116. A clock enable signal may disable or enable the clock signal to SDRAM 104. A clock enable signal may be expressed as, for example, CLKE or CKE. CKE may be used to disable the clock in conditions such as low power mode or in suspend mode. CKE may activate (HIGH) and deactivate (LOW) the CLK signal. Deactivating the clock may provide precharge power-down and SELF REFRESH operation (all banks idle), active power-down (row active in any bank), or CLOCK SUSPEND operation (burst/access in progress). CKE may be synchronous except after the device enters power-down and self-refresh modes, where CKE becomes asynchronous until after exiting the same mode. The input buffers, including CLK may be disabled during power-down and self-refresh modes, providing low standby power. CKE may be tied HIGH. Any suitable number of bits may be used on SDRAM 104 to designate or receive the clock enable signal. For example, one pin may be used.

A data mask signal may be sent from MCU 102 to SDRAM 104. This signal may be sent on, for example, logical path 116. A data mask signal may specify one or more bits that are to be masked, or not used, during a data transfer. A data mask signal may be expressed as, for example, DM or DQM #. Any suitable number of bits may be used on SDRAM 104 to designate or receive data mask signals. For example, two bits may be used.

A row address strobe (RAS) command, a column address strobe (CAS) command, and a write enable (WE) command may be sent from MCU 102 to SDRAM 104. These signals may be sent on, for example, logical path 108. These commands (RAS, CAS, WE) may specify that an associated command is an SDRAM command (such as READ, WRITE, or ACTIVE) and may be used in conjunction with address information in path 110. RAS command may be expressed as, for example, # RAS. CAS command may be expressed as, for example, # CAS. WE command may be expressed as, for example, # WE. Any suitable number of bits may be used on SDRAM 104 to designate or receive a row address strobe, column address strobe and write enable commands. For example, three bits may be used.

RAS may specify that an associated address is a row addressCAS may specify that an associated address is a column address. WE may be used to instruct SDRAM 104 about a readiness or ownership condition during the process of reading data from or writing data to SDRAM 104.

A chip select command may be sent from MCU 102 to SDRAM 104. This signal may be sent on, for example, logical path 108. A chip select command may be used to instruct SDRAM 104 about a readiness or ownership condition during the process of any SDRAM command, such as reading data from or writing data to SDRAM 104. Other such SDRAM commands may include ACTIVE, PRE-CHARGE, or BURST STOP. A chip select command may be expressed as, for example, # CS. Chip select may enable (registered LOW) and disable (registered HIH) the command decoder. All commands might be masked with chip select is registered HIGH. Any suitable number of bits may be used on SDRAM 104 to designate or receive a chip select command. For example, one bit may be used.

In one embodiment, commands to facilitate or configure the transfer of data, and the data to be written to or read from SDRAM 104, may be multiplexed. In a further embodiment, these pieces of information may be multiplexed by reusing pins or ports on MCU 102. At a first moment in time, for example, commands to facilitate or configure the transfer of data may be issued on a set of pins or ports of MCU 102. At a second moment in time, data to be written to or read from SDRAM may be exchanged on the same set of pins or ports of MCU 102. SDRAM 104 may include pins or ports for each of these different pieces of information. In one embodiment, the multiplexing of information may be used through a protocol of SDRAM 104. For example, burst mode, clock suspend, and data mask (DQM) management may be used. These may be defined according to the JEDEC standard. The burst mode may be programmable as to length, including a programmable burst length of 1, 2, 4, 8 of full page for sequential burst. A clock suspend mode configured SDRAM 104 to deactivate its internal logic, freezing the synchronous logic. DQM signals may configure SDRAM 104 to ignore data during write accesses when DQM is registered high or during a read access which allows to suppress data out from the read command. DQM may function as an input/output mask. DQM may be sampled HIGH and is an input mask signal for write accesses and an output enable signal for read accesses. Input data is masked during a WRITE cycle. The output buffers are high-impedance with a two-clock latency during a READ cycle.

As a result of multiplexing, a standard DRAM implementation with a full complement of pins to accept all data shown in FIG. 1 through unique pins may be addressed and controlled by a MCU with fewer pins. Thus, embodiments of the present disclosure may reduce the number of I/O pins needed for accessing DRAM. Furthermore, embodiments of the present disclosure may implement use of DRAM in a serial manner. In such embodiments, the DRAM may appear or function similar to serial memory. An MCU implemented according to embodiments of the present disclosure may require as many as 15-16 fewer I/O pins to interface with memory. Access to memory may be somewhat slower. The unused pins may be repurposed for other uses, or the MCU may be implemented in a smaller, less expensive manner. For example, such an embodiment may allow use of an SDR-SDRAM device in parallel with external bus interfaces to drive additional NAND flash or NOR flash memories.

The number of pins used by SDRAM 104 may depend upon the particular implementation and size of SDRAM 104. An SDRAM with 256 megabits implemented in 4M×16×4 banks may include 39 pins and require up to 39 pins of MCU 102 for I/O. MCU 102 may require numerous other pins as well. For example, an MCU with an 18-bit mode or 24-bit mode LCD and an SDRAM interface may require up to 70 I/O. Other pins, such as for power supplies, analog inputs, and serial I/O may cause a final pin count of an MCU to be more than 100 pins. Table 1 illustrates example pin requirements for various sizes of SDRAM.

TABLE 1

| Memory | No. of Pins |
| --- | --- |
| SDR-SDRAM 16 Mbits 512K × 16 × 2 Banks | 36 |
| SDR-SDRAM 64 Mbits 1 Meg × 16 × 4 Banks | 38 |
| SDR-SDRAM 128 Mbits 2 Meg × 16 × 4 Banks | 38 |
| SDR-SDRAM 256 Mbits 4 Meg × 16 × 4 Banks | 39 |

Figure 2:
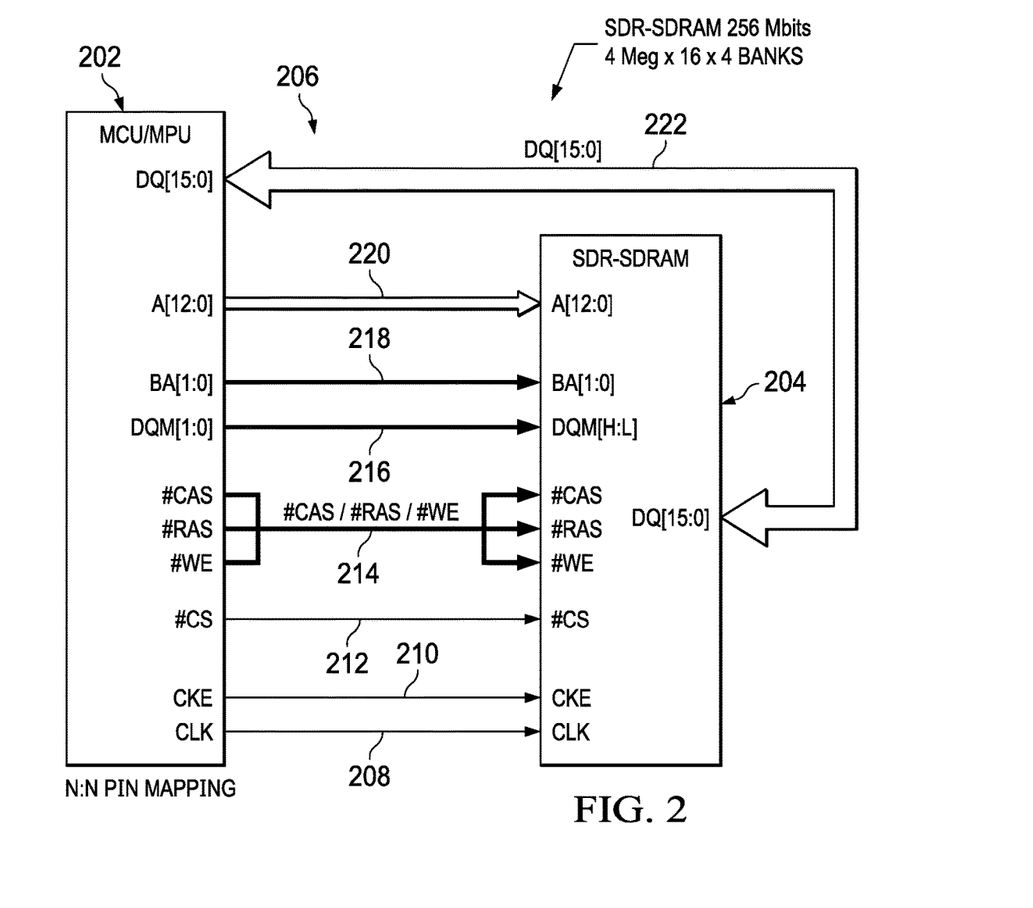
FIG. 2 illustrates an example connection between a processor and SDRAM.

FIG. 2 illustrates an example connection or interface 206 between a processor 202 and SDRAM 204. SDRAM 204 may be implemented as a 256-Mbit, 4 Meg×16×4 bank memory.

Interface 206 may include a 16-bit data or DQ connection 222 between processor 202 and SDRAM 204. Processor 202 and SDRAM 204 may each include pins for sixteen bits to accommodate data or DQ connection 222.

Interface 206 may include a 13-bit address connection 220 between processor 202 and SDRAM 204. Processor 202 and SDRAM 204 may each include pins for thirteen bits to accommodate address connection 220.

Interface 206 may include a 2-bit bank connection 218 between processor 202 and SDRAM 204. Processor 202 and SDRAM 204 may each include pins for two bits to accommodate bank connection 218.

Interface 206 may include a 2-bit mask connection 216 between processor 202 and SDRAM 204. Processor 202 and SDRAM 204 may each include pins for two bits to accommodate mask connection 216.

Interface 206 may include a connection 214 between processor 202 and SDRAM 204. Connection 214 may include bits for # CAS, # RAS, and # WE. Processor 202 and SDRAM 204 may each include pins for three bits to accommodate connection 214.

Interface 206 may include a connection 212 between processor 202 and SDRAM 204 for # CS. Processor 202 and SDRAM 204 may each include a pin for a bit to accommodate connection 212.

Interface 206 may include a connection 210 between processor 202 and SDRAM 204 for CKE. Processor 202 and SDRAM 204 may each include a pin to accommodate connection 210.

Interface 206 may include a connection 208 between processor 202 and SDRAM 204 for CLK. Processor 202 and SDRAM 204 may each include a pin to accommodate connection 208.

As a result, each of processor 202 and SDRAM 204 may have the same number of bits to implement interface 206. A 1:1 mapping of pins may be used.

Figure 3:
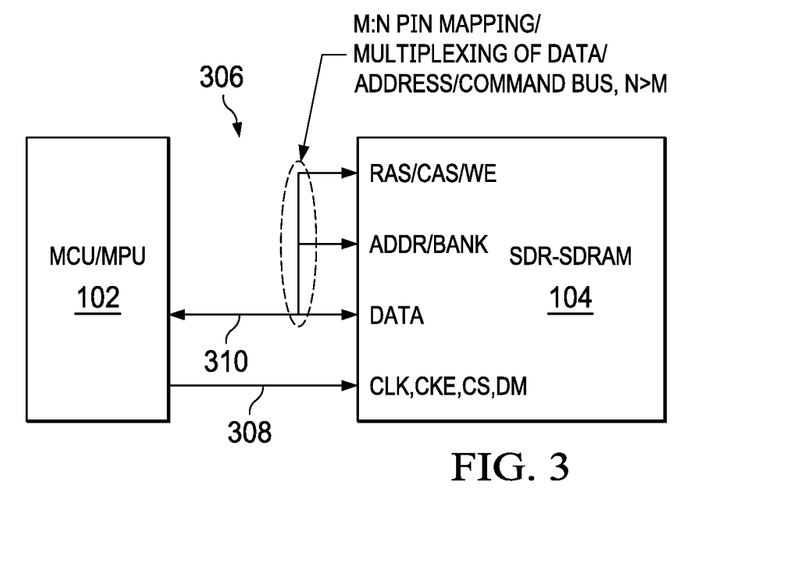
FIG. 3 illustrates an example interface between a processor and SDRAM using multiplexing through reuse of pins, according to embodiments of the present disclosure.

FIG. 3 illustrates an example interface 306 between a processor and memory using multiplexing through reuse of pins, according to embodiments of the present disclosure. In one embodiment, one or more address and data lines between the processor and the SDRAM may be multiplexed. In another embodiment, commands might also be multiplexed. In yet another embodiment, clock, CKE, CS, and DM signals might not be multiplexed. The processor may be implemented in any suitable manner, such as in the same manner implementable by MCU 102 of FIG. 1, and may implement, fully or in part, MCU 102. The memory may be implemented in any suitable manner, such as by an SDRAM.

Interface 306 illustrates that a path 310 may be used to connect MCU 102 and SDRAM 104. Path 310 may include information multiplexed by MCU 102 to connect to SDRAM 104. SDRAM 104 may maintain separate pins for each information multiplexed by path 310. MCU 102 may include a reduced number of pins. On the reduced number of pins, in one embodiment data to be written to or read from SDRAM 104 may be multiplexed with one or more commands. Furthermore, on the reduced number of pins, in one embodiment data to be written to or read from SDRAM 104 may be multiplexed with address or bank information. Path 310 might not require additional hardware between MCU 102 and SDRAM 104.

In one embodiment, a given multiplexed pin of MCU 102 may be routed to two or more pins of SDRAM 104. SDRAM 104 may be configured to, in a first mode, ignore the input provided on one of the two or more pins which are connected to the given multiplexed pin of MCU 102. SDRAM 104 may accept data from the other of such two or more pins in the first mode. In a second mode, SDRAM 104 may be configured to ignore the input provided on the another of the two or more pins and accept the input provided on the first of such pins.

Another path 308 may include information such as CLK, CKE, # CS, and DM.

Commands may be issued by MCU 102 to cause SDRAM 104 to operate in various modes, wherein in a given mode SDRAM 104 may ignore various ones of its input pins. Such commands may be controlled by a memory management circuit of MCU 102. The memory management circuit may be configured to determine how to set SDRAM 104 and what commands and information to output given a read or write request originating from software. The memory management circuit may be implemented by logic, instructions for execution, circuitry, or any suitable combination thereof in MCU 102. For example, the interface may be implemented by a core-independent peripheral (CIP) in a microcontroller that may be configured to operate independent of the execution cores or processor of the microcontroller. The memory management circuit may reside in memory management or memory access modules that handle addressing of memory in code to physical memory.

Figure 4:
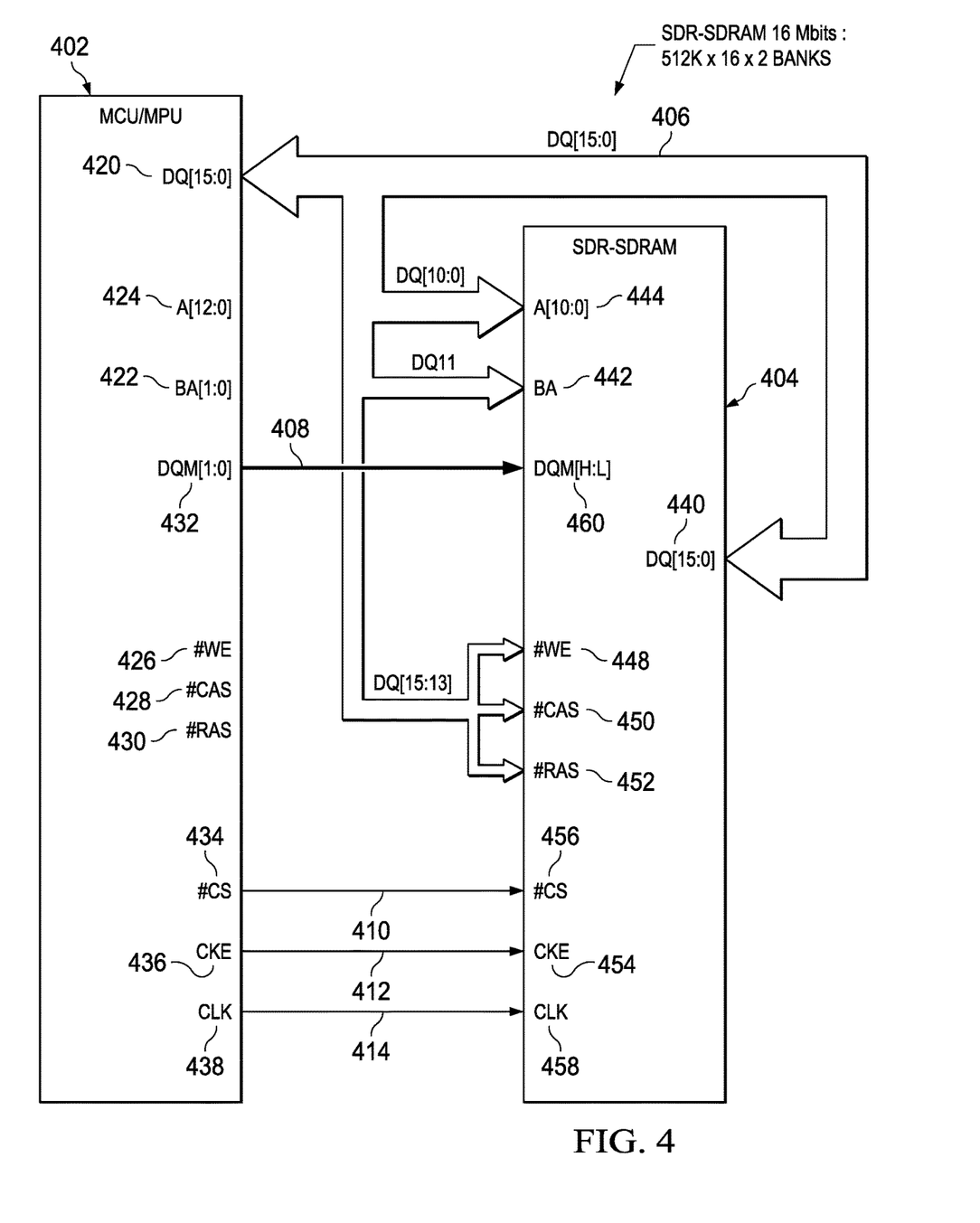
FIG. 4 illustrates an example interface using multiplexing through reuse of pins between a processor and a 16-Mbit SDRAM, according to embodiments of the present disclosure.

FIG. 4 illustrates an example interface 406 using multiplexing through reuse of pins between a processor and a 16-Mbit SDRAM memory, according to embodiments of the present disclosure. The processor may be implemented in any suitable manner, such as in the same manner implementable by MCU 102 and described in FIGS. 1 and 3, and may implement, fully or in part, MCU 102. The memory may be implemented in any suitable manner, such as by an SDRAM with 16 MBits, 512 k×16×2 banks. The processor may be referred to as MCU 402 and the memory may be referred to as SDRAM 404.

MCU 402 may include a reduced pinout configuration. MCU 402 may include pins 420. Pins 420 may be multiplexed.

In one embodiment, pins 420 may also contain data other than information to be written or read, such as setup and configuration data. Pins 420 may include such information in a first mode of operation. Pins 420 may include other information such as address information 424, bank information 422, # WE command 426, # CAS command 428, and # RAS command 430. MCU 402 might not include dedicated pins for address information 424, bank information 422, # WE command 426, # CAS command 428, and # RAS command 430. The only pins for such information might be multiplexed through pins 420, also used for DQ.

In another embodiment, pins 420 may include data pins for information to be written to or read from SDRAM 404. These may be referred to as DQ[15:0]. Pins 420 may include such information in a second mode of operation.

A multiplexed connection 406 may route pins 420 of MCU 402 to DQ pins 440, A pins 444, BA pins 442, and # WE, # CAS, # RAS pins 448, 450, 452 of SDRAM 404. A given pin of pins 420 may be routed to two pins on SDRAM 404. Such a given pin may be routed to one of DQ pins 440 and to another pin in the group of A pins 444, BA pins 442, and # WE, # CAS, # RAS pins 448, 450, 452 of SDRAM 404.

In a first mode of operation, multiplexed pins may provide setup or control information between pins 420 of MCU 402 and A pins 444, BA pins 442, and # WE, # CAS, # RAS pins 448, 450, 452 of SDRAM 404. Information written to A pins 444, BA pins 442, and # WE, # CAS, # RAS pins 448, 450, 452 of SDRAM 404 during such a first mode of operation may also be written to DQ pins 440. However, in such a first mode of operation, SDRAM 404 may be configured to ignore information on DQ pins 440 and only use information on A pins 444, BA pins 442, and # WE, # CAS, # RAS pins 448, 450, 452 of SDRAM 404.

In a second mode of operation, multiplexed pins may provide DQ information to or from pins 420 of MCU 402 and pins 440 of SDRAM 404. Data written to DQ pins 440 of SDRAM 404 during such a second mode of operation may also be written to A pins 444, BA pins 442, and # WE, # CAS, # RAS pins 448, 450, 452 of SDRAM 404. However, in such a second mode of operation, SDRAM 404 may be configured to ignore data on these pins and only use data provided to DQ pins 440. The second mode of operation may be set by MCU 402 issuing commands to configure operation of SDRAM 404 during the first mode of operation.

Accordingly, between the first mode and second mode of operation of SDRAM 404, interface 406 may be configured to multiplex commands and addressing information to be written to SDRAM 404 with data to be written to or read from SDRAM 404. Switching between the first mode and the second mode of operation may be performed using # CS 434 and # CS 456 pins. In the first mode, MCU 402 may set # CS 434 low in order to generate an SDRAM command. This value may be propagated to # CS 456 on SDRAM 404 over connection 410. In the second mode, MCU 402 may set # CS 434 high for a data mode for a read or write. This value may be propagated to # CS 456 on SDRAM 404 over connection 410. The number of data items be read or written may be a function of burst length. When a read or write command is issued to SDRAM, a block of columns equal to the burst length may be effectively selected.

Other commands or information might not be multiplexed between MCU 402 and SDRAM 404. For example, DQM pins 432 of MCU 402 may be connected to DQM pins 460 of SDRAM 404 in a 1:1 manner. # CS 434 of MCU 402 may be connected to # CS pins 456 of SDRAM 404 in a 1:1 manner. CKE pins 436 of MCU 402 may be connected to CKE pins 454 of SDRAM 404 in a 1:1 manner. CLK pins 438 of MCU 402 may be connected to CLK pins 458 of SDRAM 404 in a 1:1 manner. These may be set in any suitable mode, such as an initialization mode or a suitable one of the first mode or second mode.

Figure 5:
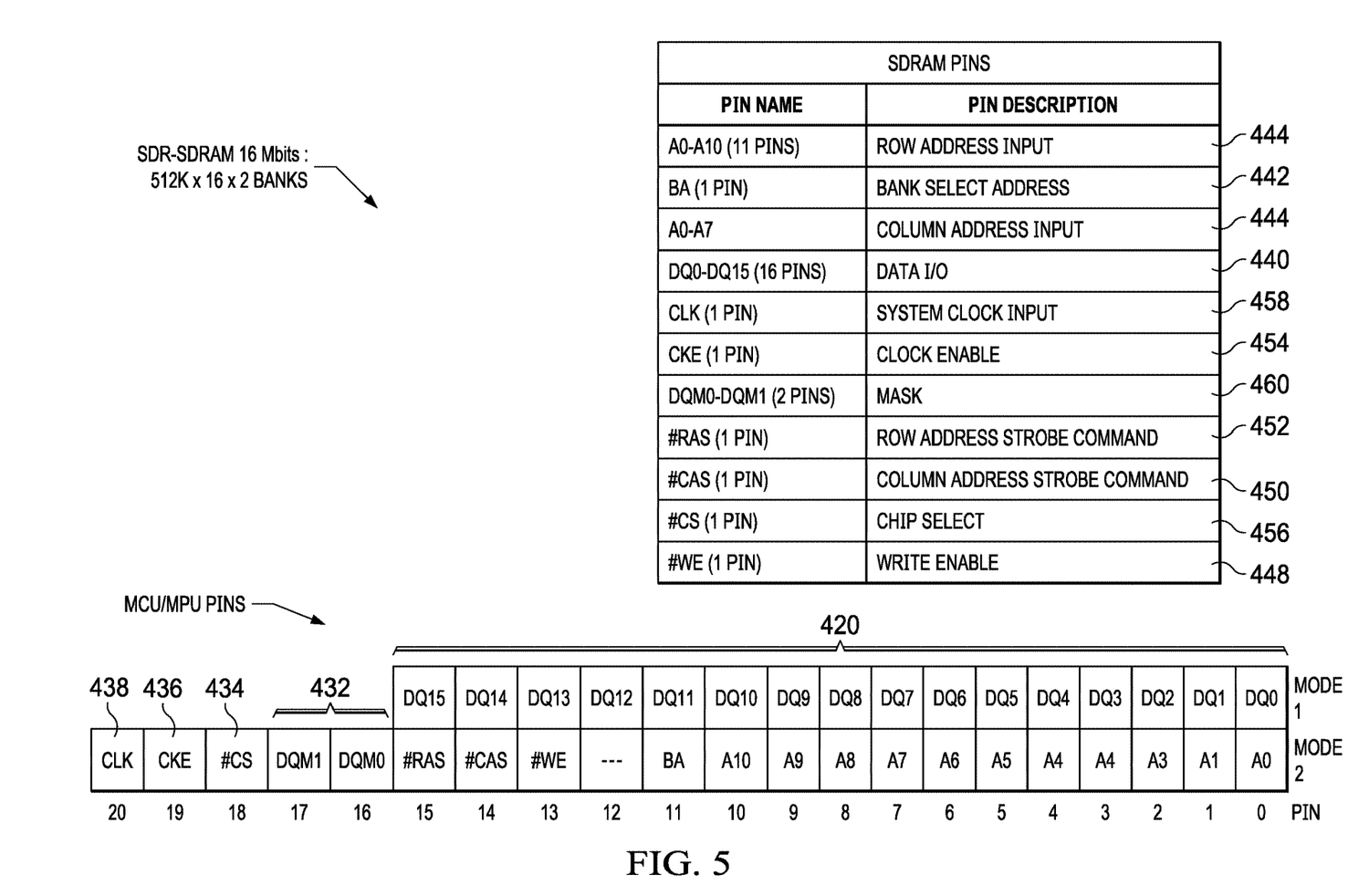
FIG. 5 illustrates another view of an example interface using multiplexing through reuse of pins between a processor and a 16-Mbit SDRAM, according to embodiments of the present disclosure.

FIG. 5 illustrates another view of an example interface 406 using multiplexing through reuse of pins between a processor and a 16-Mbit SDRAM, according to embodiments of the present disclosure. In FIG. 5, an example pinout of MCU 402 is shown at the bottom, and an example pinout of SDRAM 404 is shown at the top.

Pins 444 may include eleven address pins, denoted as A0-A10. These may be used for row address input. Address pins A0-A7 may be reused for column address input. Pins 442 may include a banking address pin, denoted as BA. Pins 440 may include sixteen pins, denoted as DQ0-DQ15. Pins 458 may include a pin, denoted as CLK. Pins 454 may include a pin, denoted as CKE. Pins 460 may include two pins, denoted as DQM0-DQM1. Pins 452 may include a pin, denoted as # RAS. Pins 450 may include a pin, denoted as # CAS. Pins 456 may include a pin, denoted as # CS. Pins 448 may include a pin, denoted as # WE. Thus, SDRAM 404 may include 36 pins.

MCU 402 may include 21 pins, enumerated from 0-20. The particular order of pins for MCU 402 may be restructured in any suitable manner. Pins 420 may include sixteen pins, enumerated from 0-15. In a first mode, pins 420 may be used for address, bank, # WE, # CAS, and # RAS. In a second mode, pins 420 may be used for data to be written to or read from SDRAM 404, denoted as DQ0-DQ15. A given pin of pins 420 may be multiplexed and routed internally in MCU 402 to different sources or destination depending upon the mode. For example, pin0 may be routed to DQ0 in the second mode. Pin0 may be routed to A0 in the first mode. Pin12 of pins 420 might not be multiplexed for another purpose in the first mode.

MCU 402 may include pins 432 for DQM0 and DQM1; pin 434 for # CS; pin 436 for CKE; and pin 438 for CLK. These pins may be dedicated and enumerated as pins 16-20.

Accordingly, data to be written to or read from SDRAM 404 may be multiplexed with address information for such data and with a subset of SDRAM commands.

Figure 6:
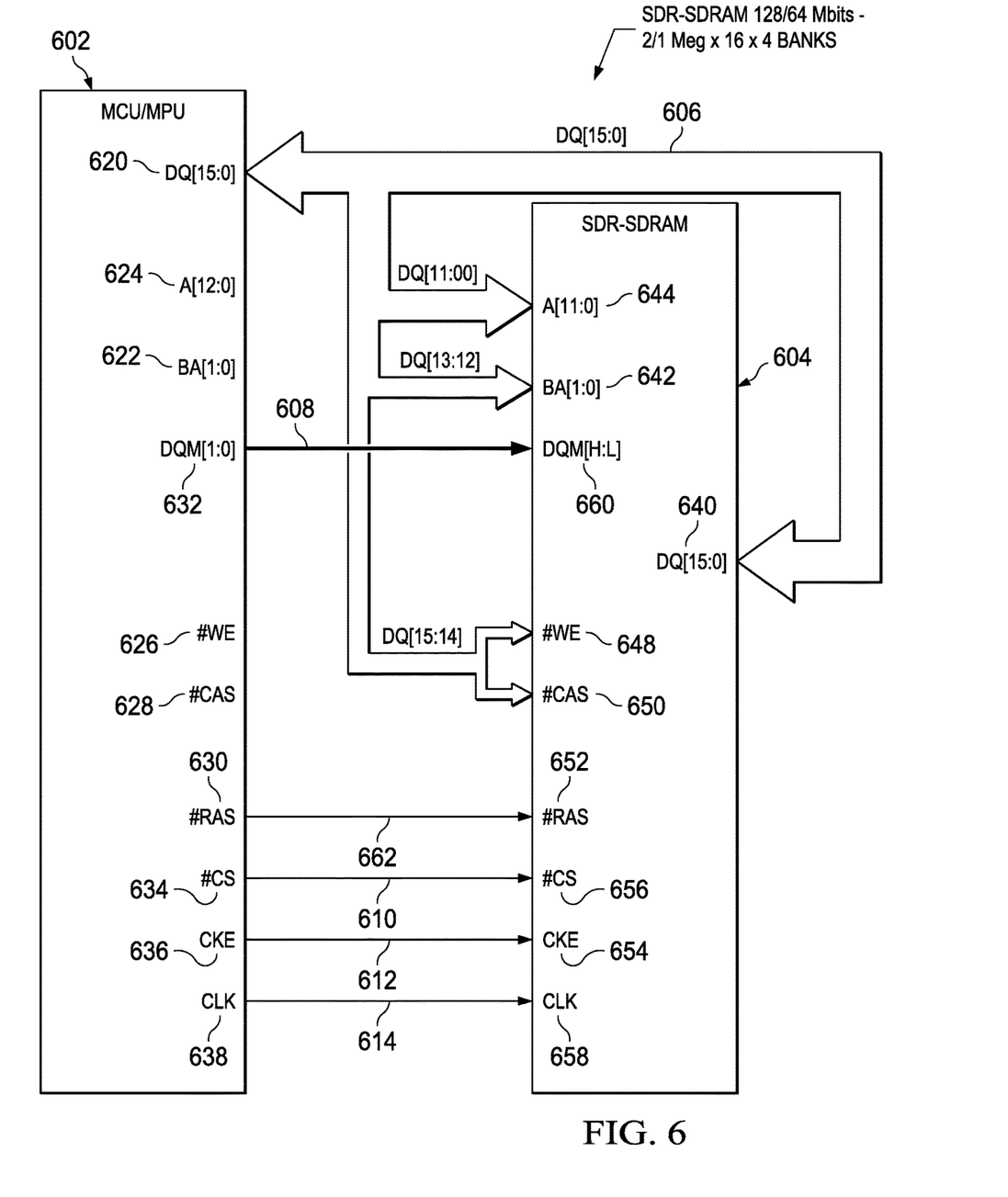
FIG. 6 illustrates an example interface using multiplexing through reuse of pins between a processor and a 64- or 128-Mbit SDRAM, according to embodiments of the present disclosure.

FIG. 6 illustrates an example interface 606 using multiplexing through reuse of pins between a processor and a 64- or 128-Mbit SDRAM, according to embodiments of the present disclosure.

The processor may be implemented in any suitable manner, such as in the same manner implementable by MCU 102 and described in FIGS. 1 and 3, and may implement, fully or in part, MCU 102. The memory may be implemented in any suitable manner, such as by an SDRAM with 128 or 64 MBits, 2 or 1 Meg×16×4 banks. The processor may be referred to as MCU 602 and the memory may be referred to as SDRAM 604.

MCU 602 may include a reduced pinout configuration. MCU 602 may include pins 620. Pins 620 may be multiplexed. In one embodiment, pins 620 may contain data for setup and configuration. Pins 620 may include such information in a first mode of operation. Pins 620 may include other information such as address information 624, bank information 622, # WE command 626, and # CAS command 628. MCU 602 might not include dedicated pins for address information 624, bank information 622, # WE command 626, and # CAS command 628. The only pins for such information might be multiplexed through pins 620, also used for DQ.

In one embodiment, pins 620 may include data pins for information to be written to or read from SDRAM 604. These may be referred to as DQ[15:0]. Pins 620 may include such information in a second mode of operation.

A multiplexed connection 606 may route pins 620 of MCU 602 to DQ pins 640, A pins 644, BA pins 642, and # WE and # CAS pins 648, 650 of SDRAM 604. A given pin of pins 620 may be routed to two pins on SDRAM 604. Such a given pin may be routed to one of DQ pins 640 and to another pin in the group of A pins 644, BA pins 642, and # WE, # CAS pins 648, 650 of SDRAM 604.

In a first mode of operation, multiplexed pins may provide setup or configuration information between pins 620 of MCU 602 and A pins 644, BA pins 642, and # WE, # CAS pins 648, 650, of SDRAM 604. Information written to A pins 644, BA pins 642, and # WE, # CAS pins 648, 650, of SDRAM 604 during such a first mode of operation may also be written to DQ pins 640. However, in such a first mode of operation, SDRAM 604 may be configured to ignore information on DQ pins 640 and only use information on A pins 644, BA pins 642, and # WE, # CAS pins 648, 650 of SDRAM 604. The first mode of operation may be set by MCU 602 issuing commands to configure operation of SDRAM 604. This may include, for example, setting # CS 634 low as described above within the context of FIG. 4.

In a second mode of operation, multiplexed pins may provide DQ information to or from pins 620 of MCU 602 and pins 640 of SDRAM 604. Data written to DQ pins 640 of SDRAM 604 during such a second mode of operation may also be written to A pins 644, BA pins 642, and # WE, # CAS pins 648, 650 of SDRAM 604. However, in such a second mode of operation, SDRAM 604 may be configured to ignore data on these pins and only use data provided to DQ pins 640. The second mode of operation may be set by MCU 602 issuing commands to configure operation of SDRAM 604 during the first mode. This may include, for example, setting # CS 634 high as described above within the context of FIG. 4.

Accordingly, between the first mode and second mode of operation of SDRAM 604, interface 606 may be configured to multiplex commands and addressing information to be written to SDRAM 604 with data to be written to or read from SDRAM 604.

Other commands or information might not be multiplexed between MCU 602 and SDRAM 604. For example, # RAS pin 630 of MCU 602 may be connected to # RAS pin 652 of SDRAM 604 over connection 662 in a 1:1 manner. DQM pins 632 of MCU 602 may be connected to DQM pins 660 of SDRAM 604 over connection 608 in a 1:1 manner. # CS 634 of MCU 602 may be connected to # CS pins 656 of SDRAM 604 over connection 610 in a 1:1 manner. CKE pins 636 of MCU 602 may be connected to CKE pins 654 of SDRAM 604 over connection 612 in a 1:1 manner. CLK pins 638 of MCU 602 may be connected to CLK pins 658 of SDRAM 604 over connection 614 in a 1:1 manner. These may be set in any suitable mode, such as an initialization mode or a suitable one of the first mode or second mode.

Figure 7:
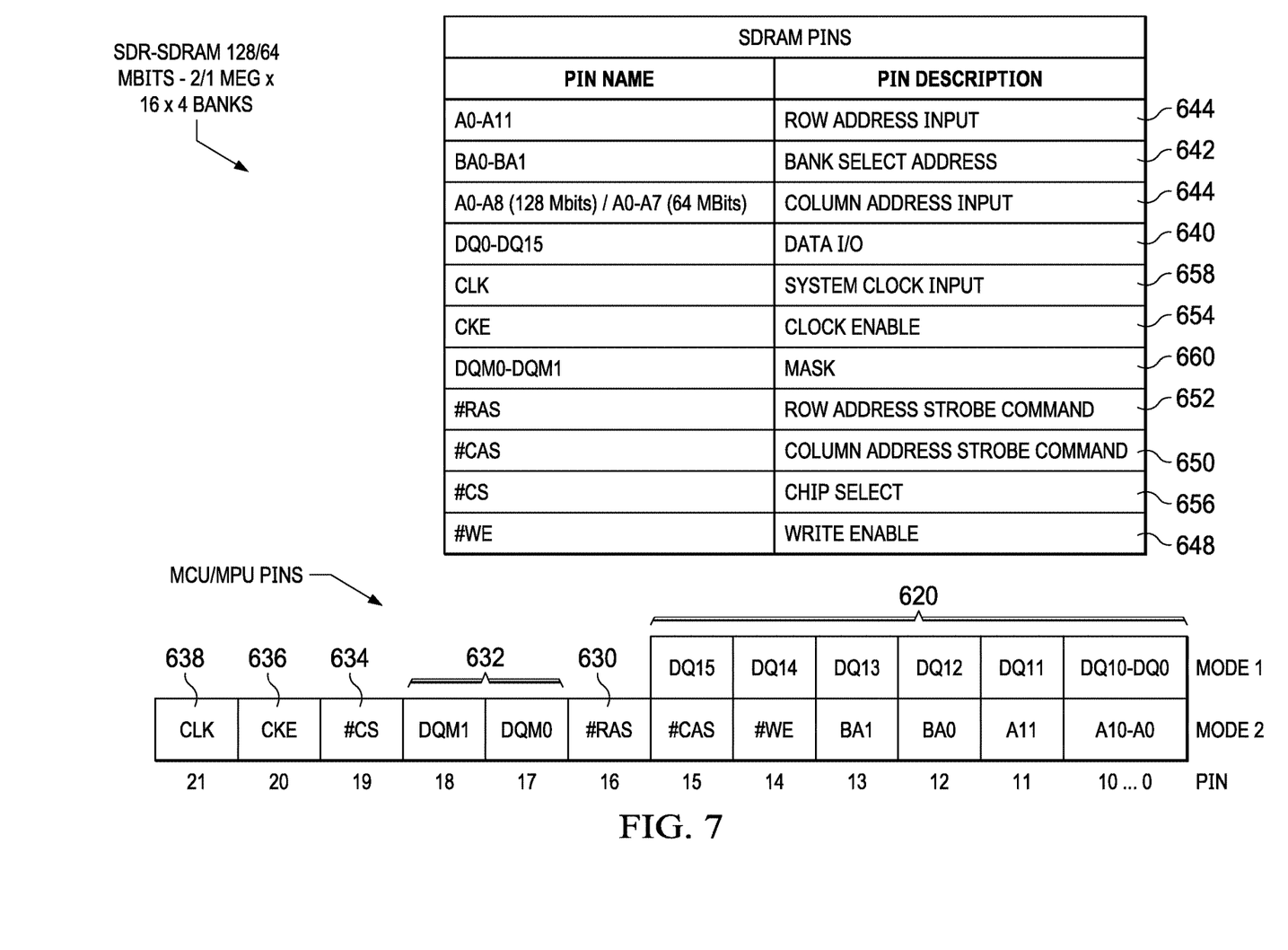
FIG. 7 illustrates another view of an example interface using multiplexing through reuse of pins between a processor and a 64- or 128-Mbit SDRAM, according to embodiments of the present disclosure.

FIG. 7 illustrates another view of an example interface 606 using multiplexing through reuse of pins between a processor and a 64- or 128-Mbit SDRAM, according to embodiments of the present disclosure. In FIG. 7, an example pinout of MCU 602 is shown at the bottom, and an example pinout of SDRAM 604 is shown at the top.

Pins 644 may include twelve address pins, denoted as A0-A11. These may be used for row address input. Address pins A0-A8 may be reused for column address input for a 128-Mbit SDRAM. Address pins A0-A7 may be reused for a column address input for a 64-Mbit SDRAM. Pins 642 may include two banking address pins, denoted as BA. Pins

640 may include sixteen pins, denoted as DQ0-DQ15. Pins 658 may include a pin, denoted as CLK. Pins 654 may include a pin, denoted as CKE. Pins 660 may include two pins, denoted as DQM0-DQM1. Pins 652 may include a pin, denoted as # RAS. Pins 650 may include a pin, denoted as # CAS. Pins 656 may include a pin, denoted as # CS. Pins 648 may include a pin, denoted as # WE. Thus, SDRAM 604 may include 38 pins.

MCU 602 may include 21 pins, enumerated from 0-20. The particular order of pins for MCU 602 may be restructured in any suitable manner. Pins 620 may include sixteen pins, enumerated from 0-15. In a first mode, pins 620 may be used for address, bank, # WE, and # CAS. In a second mode, pins 620 may be used for data to be written to or read from SDRAM 604, denoted as DQ0-DQ15. A given pin of pins 620 may be multiplexed and routed internally in MCU 602 to different sources or destination depending upon the mode. For example, pin0 may be routed to DQ0 in the second mode. Pin0 may be routed to A0 in the first mode.

MCU 602 may include pins 630 for # RAS; pins 632 for DQM0 and DQM1; pin 634 for # CS; pin 636 for CKE; and pin 638 for CLK. These pins may be dedicated and enumerated as pins 16-20.

Accordingly, data to be written to or read from SDRAM 604 may be multiplexed with address information for such data and with a subset of SDRAM commands.

Figure 8:
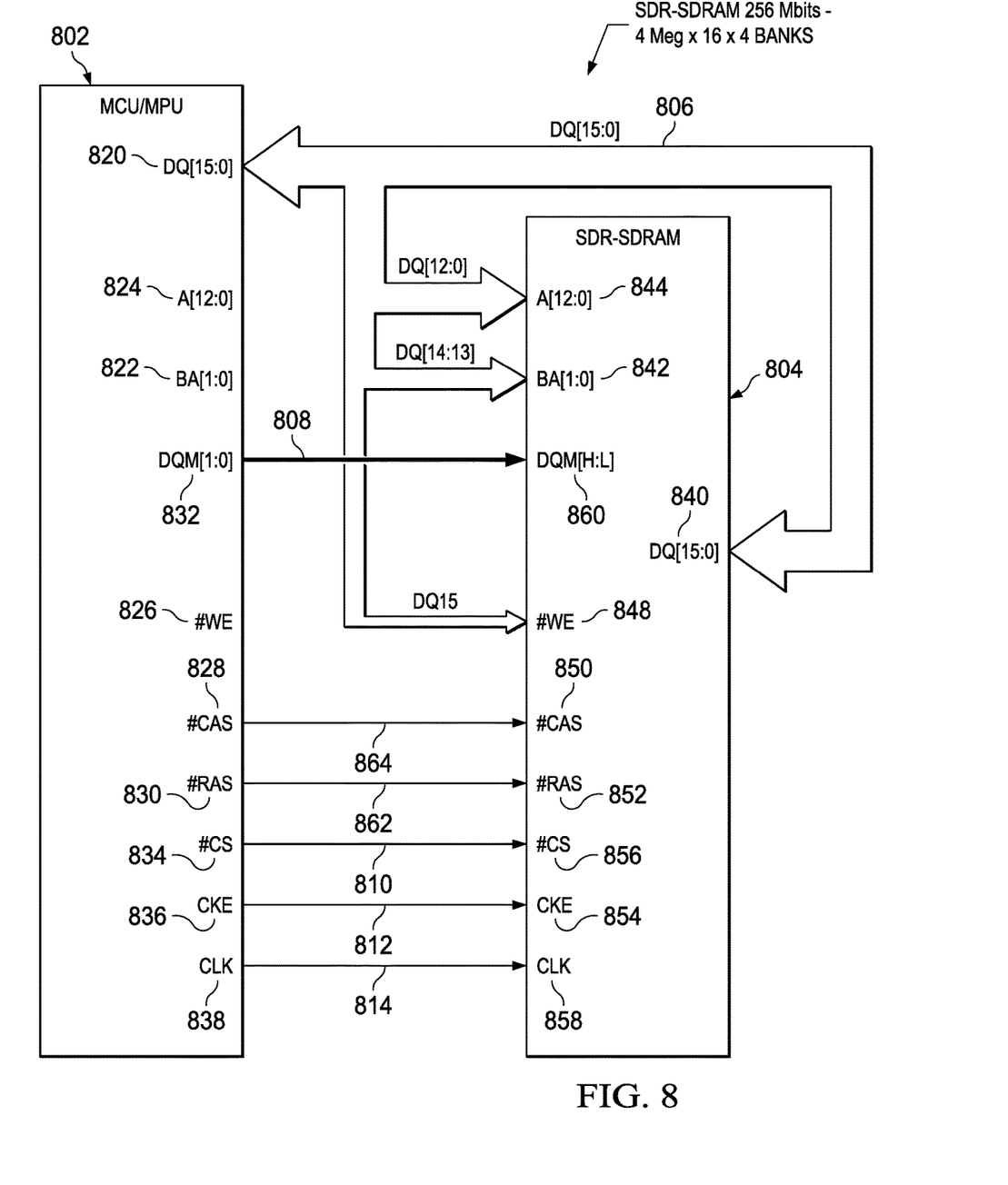
FIG. 8 illustrates an example interface using multiplexing through reuse of pins between a processor and a 256-Mbit SDRAM, according to embodiments of the present disclosure.

FIG. 8 illustrates an example interface 806 using multiplexing through reuse of pins between a processor and a 256-Mbit SDRAM, according to embodiments of the present disclosure.

The processor may be implemented in any suitable manner, such as in the same manner implementable by MCU 102 and described in FIGS. 1 and 3, and may implement, fully or in part, MCU 102. The memory may be implemented in any suitable manner, such as by an SDRAM with 256 Mbits, 4 Meg×16×4 banks. The processor may be referred to as MCU 802 and the memory may be referred to as SDRAM 804.

MCU 802 may include a reduced pinout configuration. MCU 802 may include pins 820. Pins 820 may be multiplexed. In one embodiment, pins 820 may contain data for configuration and setup. Pins 820 may include such information in a first mode of operation. Pins 820 may include other information such as address information 824, bank information 822, and # WE command 826. MCU 802 might not include dedicated pins for address information 824, bank information 822, and # WE command 826. The only pins for such information might be multiplexed through pins 820, also used for DQ.

Pins 820 may include data pins for information to be written to or read from SDRAM 804. These may be referred to as DQ[15:0]. Pins 820 may include such information in a second mode of operation.

A multiplexed connection 806 may route pins 820 of MCU 802 to DQ pins 840, A pins 844, BA pins 842, and # WE pins 848 of SDRAM 804. A given pin of pins 820 may be routed to two pins on SDRAM 804. Such a given pin may be routed to one of DQ pins 840 and to another pin in the group of A pins 844, BA pins 842, and # WE pins 848 of SDRAM 804.

In a first mode of operation, multiplexed pins may provide other information between pins 820 of MCU 802 and A pins 844, BA pins 842, and # WE pins 848 of SDRAM 804. Information written to A pins 844, BA pins 842, and # WE pins 848 of SDRAM 804 during such a first mode of operation may also be written to DQ pins 840. However, in such a first mode of operation, SDRAM 804 may be configured to ignore information on DQ pins 840 and only use information on A pins 844, BA pins 842, and # WE pins 848 of SDRAM 804. The first mode of operation may be set by MCU 802 issuing commands to configure operation of SDRAM 804. This may include, for example, setting # CS 834 low as described above within the context of FIG. 4.

In a second mode of operation, multiplexed pins may provide DQ information to or from pins 820 of MCU 802 and pins 840 of SDRAM 804. Data written to DQ pins 840 of SDRAM 804 during such a second mode of operation may also be written to A pins 844, BA pins 842, and # WE pins 848 of SDRAM 804. However, in such a second mode of operation, SDRAM 804 may be configured to ignore data on these pins and only use data provided to DQ pins 840. The second mode of operation may be set by MCU 802 issuing commands to configure operation of SDRAM 804. This may include, for example, setting # CS 834 high as described above within the context of FIG. 4.

Accordingly, between the first mode and second mode of operation of SDRAM 804, interface 806 may be configured to multiplex commands and addressing information to be written to SDRAM 804 with data to be written to or read from SDRAM 804.

Other commands or information might not be multiplexed between MCU 802 and SDRAM 804. For example, # RAS pin 830 of MCU 802 may be connected to # RAS pin 852 of SDRAM 804 over connection 862 in a 1:1 manner. DQM pins 832 of MCU 802 may be connected to DQM pins 860 of SDRAM 804 over connection 809 in a 1:1 manner. # CS 834 of MCU 802 may be connected to # CS pins 856 of SDRAM 804 over connection 810 in a 1:1 manner. CKE pins 836 of MCU 802 may be connected to CKE pins 854 of SDRAM 804 over connection 812 in a 1:1 manner. CLK pins 838 of MCU 802 may be connected to CLK pins 858 of SDRAM 804 over connection 814 in a 1:1 manner. # CAS pin 828 may be connected to # CAS pin 850 over connection 864 in a 1:1 manner. These may be set in any suitable mode, such as an initialization mode or a suitable one of the first mode or second mode.

Figure 9:
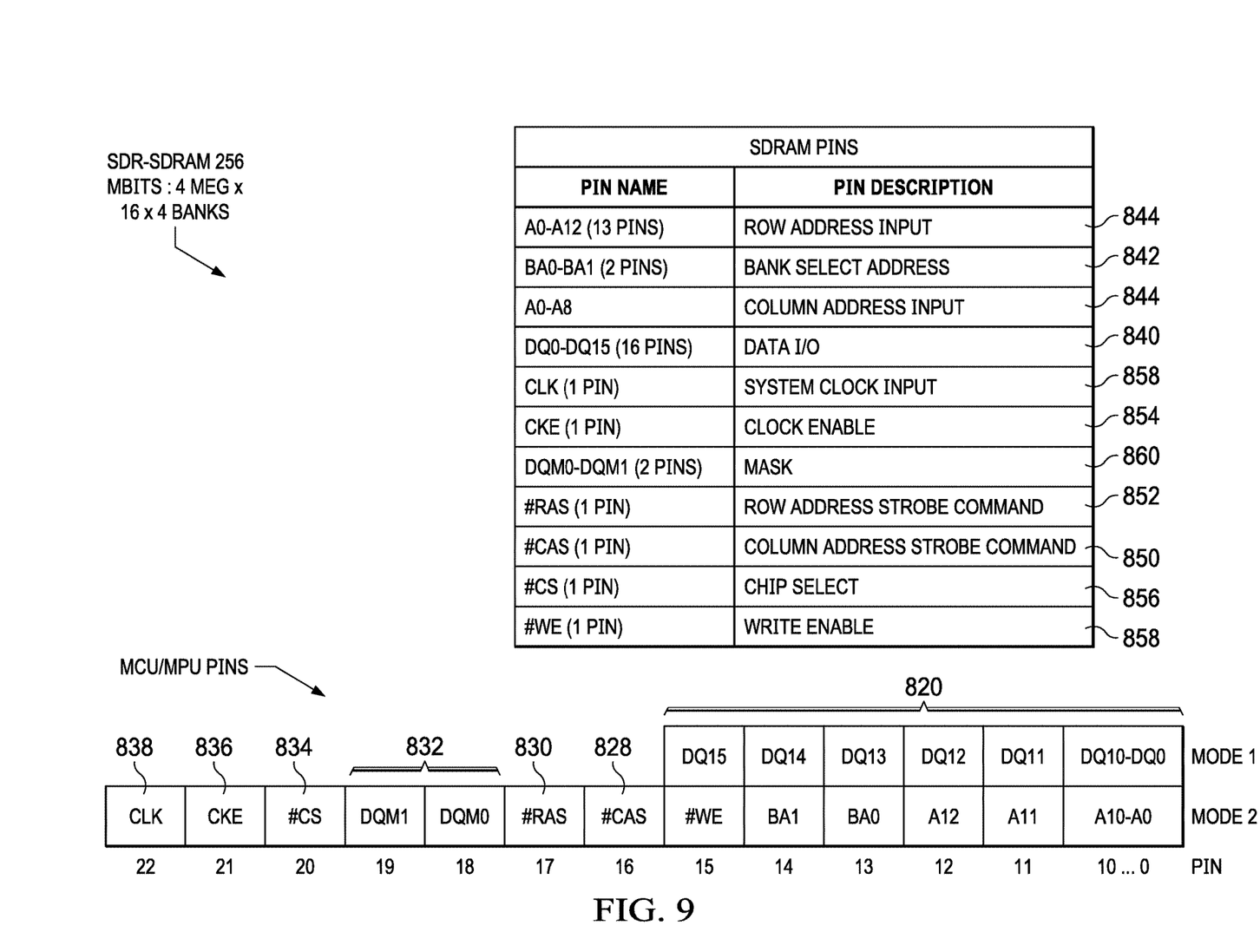
FIG. 9 illustrates another view of an example interface using multiplexing through reuse of pins between a processor and a 256-Mbit SDRAM, according to embodiments of the present disclosure.

FIG. 9 illustrates another view of an example interface 806 using multiplexing through reuse of pins between a processor and a 256-Mbit SDRAM, according to embodiments of the present disclosure. In FIG. 9, an example pinout of MCU 802 is shown at the bottom, and an example pinout of SDRAM 804 is shown at the top.

Pins 844 may include thirteen address pins, denoted as A0-A12. These may be used for row address input. Address pins A0-A8 may be reused for column address input. Pins 842 may include two banking address pins, denoted as BA. Pins 840 may include sixteen pins, denoted as DQ0-DQ15. Pins 858 may include a pin, denoted as CLK. Pins 854 may include a pin, denoted as CKE. Pins 860 may include two pins, denoted as DQM0-DQM1. Pins 852 may include a pin, denoted as # RAS. Pins 850 may include a pin, denoted as # CAS. Pins 856 may include a pin, denoted as # CS. Pins 848 may include a pin, denoted as # WE. Thus, SDRAM 804 may include 39 pins.

MCU 802 may include 21 pins, enumerated from 0-20. The particular order of pins for MCU 802 may be restructured in any suitable manner. Pins 820 may include sixteen pins, enumerated from 0-15. In a first mode, pins 820 may be used for address, bank, and # WE. In a second mode, pins 820 may be used for data to be written to or read from SDRAM 804, denoted as DQ0-DQ15. A given pin of pins 820 may be multiplexed and routed internally in MCU 802 to different sources or destination depending upon the mode.

For example, pin0 may be routed to DQ0 in the second mode. Pin0 may be routed to A0 in the first mode.

MCU 802 may include pins 828 for # CAS; pins 830 for # RAS; pins 832 for DQM0 and DQM1; pin 834 for # CS; pin 836 for CKE; and pin 838 for CLK. These pins may be dedicated and enumerated as pins 16-20.

Accordingly, data to be written to or read from SDRAM 804 may be multiplexed with address information for such data and with a subset of SDRAM commands.

As shown between FIGS. 4-9, various commands may be multiplexed or dedicated. In various embodiments, one or more of # CAS, # RAS, # WE, banking, or address information may be produced on multiplexed pins while one or more of others of # CAS, # RAS, # WE, banking, or address information may be produced on dedicated pins. For example, the multiplexing of # CAS in FIGS. 6-7 may be substituted with the multiplexing of # RAS, # WR, banking, or address information. In one embodiment, as command or address information bit may be multiplexed for every data bit (representing information to be written to or read from the SDRAM) used by the SDRAM. DQM, CS, CKE, and CLK might not be multiplexable.

Table 2 illustrates a summary of pinout results according to various embodiments of the present disclosure.

TABLE 2

| Density | No Mux | data/addr/ cmd Mux |
|---|---|---|
| SDR-SDRAM 16 Mbits 512K × 16 × 2 Banks | 36 | 21 |
| SDR-SDRAM 64 Mbits 1 Meg × 16 × 4 Banks | 38 | 22 |
| SDR-SDRAM 128 Mbits 2 Meg × 16 × 4 Banks | 38 | 22 |
| SDR-SDRAM 256 Mbits 4 Meg × 16 × 4 Banks | 39 | 23 |

To allow merging of address, data and command information, embodiments of the present disclosure may utilize burst mode of SDRAM. Read and write accesses to SDRAM may be burst-oriented. Moreover, the burst length may be programmable. The burst length may determine the maximum number of column locations that can be accessed for a given READ or WRITE command. Burst lengths may include lengths of 1, 2, 4, 8, or continuous locations are used for sequential and interleaved burst modes. A continuous page burst is also used for sequential modes. The continuous page burst is used in conjunction with DQM, clock stop, and commands to generate arbitrary burst lengths.

When a read or write command is issued to SDRAM, a block of columns equal to the burst length is effectively selected. All accesses for that burst take place within this specified block. The burst wraps within the block when a boundary is reached. When the burst length is, for example, eight, eight bits of data may be read or written. The starting address could be any of 0-7. If the starting column address is six, for example, then the read or write sequence will be 6, 7, 0, 1, 2, 3, 4, 5. In this example, the boundary is 7.

The block is uniquely selected by Addr[8:1] when BL=2, Addr[8:2] when BL=4, and Addr[8:3] when BL=8. The block is the number of columns. When block length is eight, then eight data bits may be accessed for one read command or write command.

The remaining (least significant) address bits are used to select the starting location within the block. Continuous page bursts wrap within the page when the boundary is reached. Embodiments of the present disclosure may use continuous page bursts. In other embodiments, other burst lengths can be used.

Returning to FIG. 5 as an example SDRAM, to write data from MCU 402 to SDRAM 404, a write command may be multiplexed on pin13-pin15, which would otherwise be used for DQ[15]-DQ[13]. A combination of (RAS=1), (CAS=0), (CS=0), and (WE=0) may be used to establish a write command. Pin11 may include a BA value selecting which bank includes the address to be written to. Pin11 may otherwise be used for DQ[11]. Address values in pin0-pin10 may specify the row location. Address values in pin0-pin7 may specify the column location. In one embodiment, the starting column location may be adjusted to be one bit less than an intended starting point. For example, if an intended write address is 0x00, then the address provided may be set to 0xff. This adjustment may exploit the nature of continuous page bursts to wrap within a page when the boundary (such as 0xff) is reached. Accordingly, by adjusting the starting column to one less than the intended start location and using continuous bursting, an address and data to be written do not have to be available to SDRAM at the same instant. The address (adjusted to be one location less) may be provided first, and then data provided second. DQM may be set on pin16 and pin17 so that data is not written in the cycle in which address and command information is provided. These steps may be performed during a first cycle of SDRAM 404. This cycle may be referred to as an address cycle.

SDRAM 404 may cycle forward to a write cycle. In this next, subsequent cycle, data to be written may be provided by MCU 402 on pin0-pin15, corresponding to DQ0-DQ15. This data, due to the continuous burst command previously issued, may be written into the selected memory array of SDRAM 404. This write may be subject to further DQM input logic levels appearing (low) coincident with the data.

During the address cycle, DQM is registered high to mask writing. Accordingly, the values multiplexed on pin0-pin15 of MCU 402 that would otherwise be provided to DQ0-DQ15 of SDRAM 404 have no effect in SDRAM 404 during the address cycle. Instead, address values and commands on pin0-pin15 of MCU 402 are appropriately read on corresponding pins of SDRAM 404. The address provided during the address cycle is one less location than the address to be actually written during the write cycle. Due to the continuous burst mode, the address need not be provided during the write cycle and thus is ignored when data values are instead provided on pin0-pin15 of MCU 402.

A10 input determines whether auto precharge is used in SDRAM 404. If auto precharge is selected, the row being accessed is precharged at the end of the write burst. If auto precharge is not selected, the row remains open for subsequent accesses. CKE is used to suspend burst in progress. For each positive clock edge on which CKE is sampled and found to be low, the next internal positive clock edge is suspended. Any command or data present on the input when an internal clock edge is suspended will be ignored. Furthermore, any data present on the DQ[15:0] remains driven. Burst counters are not incremented, as long as the clock is suspended. One cycle after CKE is low, then DQM is high. The corresponding data input are ignored.

Accordingly, a read operation may be issued from MCU 402 to SDRAM 404. A read command may be issued on pin13-pin15, which would otherwise be multiplexed as DQ13-DQ15. Values of (RAS=1), (CAS=0), (CS=0), and (WE=1) may specify a read command. The read command may be used to initiate a burst read access to an active row. The value of BA on pin11 (otherwise multiplexed as DQ11) selects the bank. Address values in pin0-pin10 may specify the row location. Address values in pin0-pin7 may specify the column location. These values might otherwise be multiplexed as DQ0-DQ7 or DQ0-DQ9. The value on pin10 determines whether auto precharge is used. If auto precharge is selected, the row being accessed is precharged at the end of the read burst. If auto precharge is not selected, the row remains open for subsequent accesses. The read command and address information may be provided in a first execution cycle referred to as an address cycle.

In a subsequent execution cycle, data to be read may appear from DQ[15:0] on SDRAM 404 and mapped to pin0-pin15. Read data in the execution cycle may depend upon the logic level of DQM inputs provided during the address cycle or a cycle before the address cycle. If DQM was registered high, then the corresponding data output of SDRAM 404 may be high-impendence two clocks later. If the DQM signal was registered low, the data output of SDRAM 404 will provide valid data. CKE may be used to suspend a burst in progress. For each positive clock edge on which CKE is sampled low, the next internal positive clock edge may be suspended. Any command or data present on the input when an internal clock edge is suspended may be ignored; any data present on the DQ[15:0] output of SDRAM 404 remains driven. To reset an active current access, CKE may be issued to suspend internal logic and DQM may be issued to enact high impedance on the busses.

Embodiments of the present disclosure may be slower than other solutions as a clock cycle of SDRAM may be used for addressing and a subsequent clock cycle for reading or writing data. Furthermore, a pipelined architecture of an SDRAM device may go unused. A read or write command might not be initiated on any clock cycle following a read or write command. Before starting a new access, the current access must be ended. The next address is supplied to the SDRAM after the current operation completes.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:

1. An apparatus, comprising:
    an interface for dynamic random access memory (DRAM); and
    an integrated circuit including:
        a memory pinout configured to connect to the DRAM memory; and
        control logic circuit configured to:
            multiplex address information, command information, and data to be written to or read from the DRAM memory on a subset of pins of the memory pinout to the DRAM memory; and
            route other signals on other pins of the memory pinout to the DRAM memory in parallel with the multiplexed address information, command information, and data information;
    wherein the command information is configured to cause the DRAM memory to:
        in first cycle, load initial address information;
        in a second cycle subsequent to the first cycle:
            use implicit address information derived from the initial address information;
            write or read data using pins that held the initial address information in the first cycle.

2. The apparatus of claim 1, wherein the command information is configured to cause the DRAM memory to ignore input pins of the DRAM memory configured to receive data to be written to the DRAM memory.

3. The apparatus of claim 1, wherein the initial address information is provided at a location before a desired address location for the write of data.

4. The apparatus of claim 1, wherein the control logic circuit is configured to multiplex address information, command information and data to be written to or read from the DRAM memory by:
    sending command and address information in the first cycle to the DRAM memory on a set of pins; and
    sending or receiving data to be written to or read from the DRAM memory in the second cycle on the set of pins.

5. The apparatus of claim 1, wherein the control logic circuit is configured to multiplex address information, command information and data to be written to or read from the DRAM memory by:
    sending command and address information in the first cycle to the DRAM memory, wherein the command information configures the DRAM memory to ignore input data pins in the first cycle.

6. The apparatus of claim 1, wherein the control logic circuit is configured to multiplex address information, command information and data to be written to or read from the DRAM memory by:
    in the first cycle, routing command information and address information from a same set of pins on the integrated circuit as data to be written to or read from the DRAM memory;
    wherein the command information configures the DRAM memory to ignore input data received at the DRAM memory from the set of pins on the integrated circuit.

7. The apparatus of claim 1, wherein the control logic circuit is configured to multiplex address information, command information and data to be written to or read from the DRAM memory by:
    routing command information and address information from a same set of pins on the integrated circuit as data to be written to or read from the DRAM memory;
    wherein a data pin on the DRAM memory and a command pin on the DRAM memory are connected to a same given pin on the integrated circuit, the given pin a member of the set of pins.

8. The apparatus of claim 1, wherein the command information to be multiplexed with the data to be written to or read from the DRAM memory includes one or more of a column address strobe command, a row address strobe command, and a write enable command.

9. The apparatus of claim 1, wherein the control logic circuit is configured to multiplex address information, command information and data to be written to or read from the DRAM memory by:
    using a data mask to instruct the DRAM memory to ignore present values on data input pins of the DRAM memory;
    set reading or writing of data to continuous burst mode; and
    set an address to a location previous to an intended write location or an intended read location.

10. A method, comprising:
    from an integrated circuit, accessing a dynamic random access memory (DRAM) using a memory pinout on the integrated circuit;

multiplexing address information, command information, and data to be written to or read from the DRAM memory on a subset of pins of the memory pinout to the DRAM memory; and routing other signals on other pins of the memory pinout to the DRAM memory in parallel with the multiplexed address information, command information, and data information;

wherein the command information causes the DRAM memory to:
 in first cycle, load initial address information; and
 in a second cycle subsequent to the first cycle:
  use implicit address information derived from the initial address information; and
  write or read data using pins that held the initial address information in the first cycle.

11. The method of claim 10, wherein the command information is configured to cause the DRAM memory to ignore input pins of the DRAM memory configured to receive data to be written to the DRAM memory.

12. The method of claim 10, wherein the initial address information is provided at a location before a desired address location for the write of data.

13. The method of claim 10, further comprising multiplexing address information, command information and data to be written to or read from the DRAM memory by:
 sending command and address information in the first cycle to the DRAM memory on a set of pins; and
 sending or receiving data to be written to or read from the DRAM memory in the second cycle on the set of pins.

14. The method of claim 10, further comprising multiplexing address information, command information and data to be written to or read from the DRAM memory by:
 sending command and address information in the first cycle to the DRAM memory, wherein the command information configures the DRAM memory to ignore input data pins in the first cycle.

15. The method of claim 10, further comprising multiplexing address information, command information and data to be written to or read from the DRAM memory by:
 in the first cycle, routing command information and address information from a same set of pins on the integrated circuit as data to be written to or read from the DRAM memory;
 wherein the command information configures the DRAM memory to ignore input data received at the DRAM memory from the set of pins on the integrated circuit.

16. The method of claim 10, further comprising multiplexing address information, command information and data to be written to or read from the DRAM memory by:
 routing command information and address information from a same set of pins on the integrated circuit as data to be written to or read from the DRAM memory;
 wherein a data pin on the DRAM memory and a command pin on the DRAM memory are connected to a same given pin on the integrated circuit, the given pin a member of the set of pins.

17. The method of claim 10, further comprising multiplexing address information, command information and data to be written to or read from the DRAM memory by:
 using a data mask to instruct the DRAM memory to ignore present values on data input pins of the DRAM memory;
 set reading or writing of data to continuous burst mode; and
 set an address to a location previous to an intended write location or an intended read location.

18. A microcontroller, comprising:
 a dynamic random access memory (DRAM); and
 a memory pinout configured to connect to the DRAM memory; and
 control logic circuit configured to:
  multiplex address information, command information, and data to be written to or read from the DRAM memory on a subset of pins of the memory pinout to the DRAM memory; and
  route other signals on other pins of the memory pinout to the DRAM memory in parallel with the multiplexed address information, command information, and data information;
  wherein the command information is configured to cause the DRAM memory to:
   in first cycle, load initial address information; and
   in a second cycle subsequent to the first cycle:
    use implicit address information derived from the initial address information; and
    write or read data using pins that held the initial address information in the first cycle.

* * * * *